May 2, 1961  C. L. MICHAUD  2,982,758
CONTINUOUS BULK POLYMERIZATION PROCESS
Filed Oct. 24, 1957
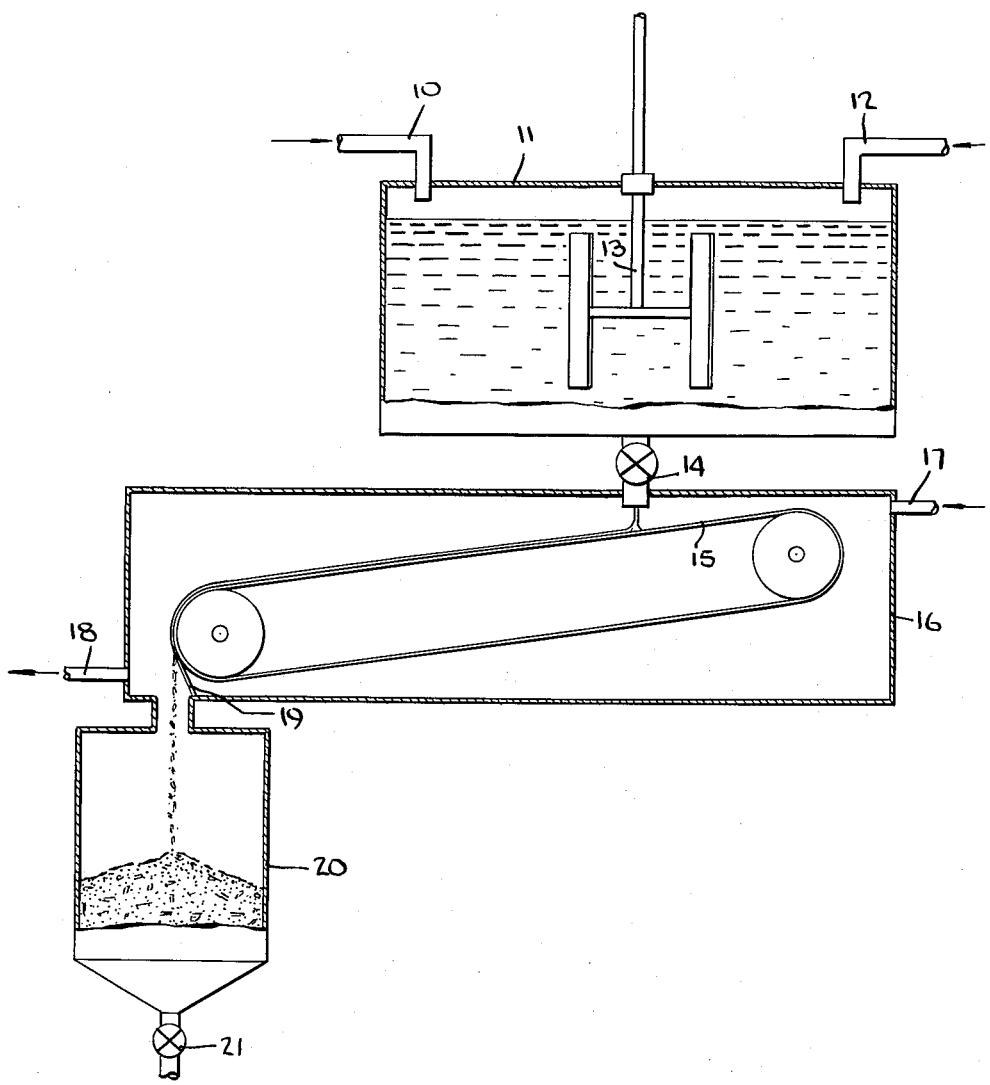
INVENTOR.
CLARENCE L. MICHAUD
BY
Felix Klass and Ernest Cheslow
ATTORNEYS 2,982,758
Patented May 2, 1961

2,982,758
CONTINUOUS BULK POLYMERIZATION PROCESS

Clarence L. Michaud, Springfield, N.J., assignor to Celanese Corporation of America, New York, N.Y., a corporation of Delaware Filed Oct. 24, 1957, Ser. No. 692,101

9 Claims. (Cl. 260—67)

This invention relates to trioxane polymerization and more particularly to a continuous method for rapidly producing tough, high molecular weight polymers from trioxane.

It is known that trioxane polymerizes in the presence of certain catalytic materials to produce tough, high molecular weight polymers and that the polymerization process, with some catalysts is almost instantaneous. For example boron fluoride acts almost instantaneously on molten trioxane to produce a tough polymer in almost a full field, as disclosed in application Serial No. 691,144 filed by Donald E. Hudgin and Frank M. Berardinelli on October 21, 1957. Complexes of boron fluoride with organic compounds in which oxygen or sulfur is the donor atom, such as boron fluoride etherate also polymerize almost instantaneously, as disclosed in application Serial No. 691,143 filed by Hudgin and Berardinelli on October 21, 1957.

The rapid and substantially complete polymerization reaction with the rapid formation of a solid phase product makes it difficult to remove the product from the reaction vessel. It has been proposed to dissolve the trioxane in a large amount of solvent so that the polymer will form as a suspension of discrete particles, but this procedure slows down the reaction.

It is an object of this invention to provide a novel method of handling the polymerization reaction whereby the reaction is carried out continuously with full advantage being taken of the rapidity of the reaction. Other objects will appear hereinafter.

The objects of this invention are accomplished by a process which comprises intimately admixing liquid phase trioxane and a polymerization catalyst and partially polymerizing said trioxane in a first reaction zone, withdrawing a mixture of trioxane polymer, unreacted trioxane and polymerization catalyst from said first reaction zone, distributing said mixture as a layer on a solid surface in a second reaction zone and continuing the polymerization reaction in said second polymerization zone.

In a specific embodiment of the invention, as illustrated in the drawing, molten trioxane is continuously introduced through line 10 into confined vessel 11 in which a reaction mixture is maintained at about 75° C. Boron fluoride etherate in a one weight percent solution in dry benzene is continuously introduced through line 12 at a rate which is about 0.02 percent by weight of the trioxane introduction rate.

The reaction mixture in vessel 11 is vigorously stirred by agitator 13 which rotates at about 10,000 r.p.m. The agitated mixture is continuously withdrawn from vessel 11 through withdrawal line 14 and dropped onto a moving belt 15 upon which the polymerization initiated in vessel 11 continues to substantial completion. The withdrawal rate through line 14 is controlled to be equal to the combined feed rate through lines 10 and 12 so that the amount of reaction mixture in vessel 11 remains constant. The withdrawal rate is such that if feed were discontinued the vessel would be emptied in about 10 seconds. The degree of polymerization in vessel 11 is thus controlled so that the reaction mixture remains substantially liquid and flows easily through withdrawal line 14.

Moving belt 15 is enclosed within heated chamber 16 which is maintained at a temperature of 100° C. by the passage of heated nitrogen therethrough, the nitrogen being introduced through line 17 and withdrawn through line 18. The heated nitrogen stream vaporizes and carries off most of the benzene and catalyst in the reaction mixture and a portion of the unreacted trioxane.

The polymer formed on the moving belt is scraped off by blade 19 and drops into polymer collector 20 from which it is removed through star valve 21. The moving belt moves at a rate which provides a reaction layer having a thickness of ½ inch and a reaction time of 5 seconds.

The polymer produced as described above is washed with acetone and water until it is free of the remaining unreacted trioxane and the remaining catalyst and benzene, if any, and then dried and ground to pass through a 60 mesh sieve. It may then be molded at 180° C. for two minutes, particularly after stabilization with five weight percent of diphenylamine to produce tough molded objects.

While the invention has been described with particular reference to a preferred modification it is to be understood that other modifications may be used without departing from the scope of the invention.

For example, the temperature of the reaction mixture in vessel 11 may vary from about 65° to about 114° C. although temperatures between about 70° and 110° are preferred. The average residence time in vessel 11 may vary from about 1 to about 60 seconds, with residence times from about 5 to about 10 seconds, being preferred.

The proportion of catalyst to trioxane in the reaction mixture may vary from about 0.005% to about 0.1% by weight.

The temperature of the reaction mixture on belt 15 may vary from about 80° to about 114° C., the thickness of the reaction layer may vary from about ⅛ inch to about one inch and the reaction time on the belt may vary from about 3 seconds to about 10 minutes.

The boron fluoride etherate may be dissolved in solvent other than benzene or may be added without a solvent. Boron fluoride complexes with other organic compounds in which oxygen or sulfur is the donor atom may be used in place of boron fluoride ethereate or, if desired, boron fluoride gas may be dissolved in an inert solvent such as benzene, and used as a catalyst. Other catalysts, such as hydrogen fluoride, phosphorus pentafluoride and certain metallic fluorides, known in the art, may also be used although they require longer reaction periods than boron fluoride and its complexes.

The reactant trioxane is preferably not diluted with large amounts of solvents which would slow up the polymerization reaction considerably. However, the trioxane may contain small amounts of other materials to modify its melting point, viscosity or surface tension or may contain dissolved materials intended as plasticizers or stabilizers in the polymer without departing from the scope of this invention. It is to be understood that the term "molten trioxane" as used herein does not preclude compositions containing minor amounts of materials other than trioxane.

In other modifications the moving belt may be replaced by a rotating drum or by a rotating horizontal disc.

It is to be understood that the foregoing detailed description is given merely by way of illustration and that many variations may be made therein without departing from the spirit of my invention.

Having described my invention what I desire to secure by Letters Patent is:

1. A process for polymerizing trioxane which comprises intimately admixing molten trioxane and a polymerization catalyst therefor and partially polymerizing said trioxane in a first reaction zone, withdrawing a mixture of trioxane polymer, unreacted trioxane and polymerization catalyst from first reaction zone, distributing said mixture as a layer on a solid surface in a second reaction zone heated to polymerization temperature and substantially completing the polymerization reaction in said second polymerization zone.

2. A continuous process for polymerizing trioxane which comprises continuously introducing and intimately admixing liquid phase trioxane and a polymerization catalyst therefor and partially polymerizing said trioxane in a first reaction zone at polymerization temperature, continuously withdrawing a mixture of trioxane polymer, unreacted trioxane and polymerization catalyst from said first reaction zone, continuously distributing said mixture as a layer on a solid surface in a second reaction zone and substantially completing the polymerization in said second polymerization zone at about 80–114° C.

3. A continuous process for polymerizing trioxane which comprises continuously introducing and intimately admixing molten trioxane and a polymerization catalyst therefor and partially polymerizing said trioxane in a first reaction zone, continuously withdrawing a mixture of trioxane polymer, unreacted trioxane and polymerization catalyst from said first reaction zone, continuously distributing said mixture as a layer on a moving solid surface in a second reaction zone heated to polymerization temperature and substantially completing the polymerization reaction in said second polymerization zone.

4. A continuous process for polymerizing trioxane which comprises continuously introducing molten trioxane into a first reaction zone maintained at between about 70° and 75° C. continuously introducing into said first reaction zone a catalyst comprising a boron fluoride complex with an oragnic compound in which an element of the group consisting of oxygen and sulfur is the donor atom, intimately admixing said molten trioxane and said catalyst and partially polymerizing said trioxane in said first reaction zone, continuously withdrawing a mixture of trioxane polymer, unreacted trioxane and polymerization catalyst from said first reaction zone, continuously distributing said mixture as a layer on a moving solid surface in a second reaction zone heated to polymerization temperature, substantially completing the polymerization reaction in said second polymerization reaction zone and removing polymer from said moving solid surface.

5. A continuous process for polymerizing trioxane which comprises continuously introducing molten trioxane into a first reaction zone maintained at between about 70° C. and 110° C. continuously introducing into said first reaction zone a catalyst comprising a boron fluoride complex with an organic compound in which an element of the group consisting of oxygen and sulfur is the donor atom, said catalyst being introduced at a rate such that the concentration of catalyst is between about 0.005% and about 0.1% of the weight of the trioxane, intimately admixing said molten trioxane and said catalyst and partially polymerizing said trioxane in said first reaction zone, continuously withdrawing a mixture of trioxane polymer, unreacted trioxane and polymerization catalyst from said first reaction zone, continuously distributing said mixture as a layer on a moving solid surface in a second reaction zone heated to polymerization temperature in contact with said layer, substantially completing the polymerization reaction in said second polymerization reaction zone and scraping polymer from said moving solid surface.

6. The process of claim 5 wherein said catalyst is boron fluoride etherate.

7. The process of claim 3 wherein said catalyst is boron fluoride gas dissolved in an inert organic solvent.

8. The process of claim 3, wherein said polymerization catalyst is a fluoride catalyst which is present in said admixture in an amount between about 0.005 percent and about 0.1 percent based on the weight of trioxane and wherein said first reaction zone is maintained at a temperature between about 65° C. and about 114° C.

9. The process of claim 5, wherein the residence time of said reaction mixture in said first reaction zone is between about 1 and about 60 seconds, wherein the temperature in said second reaction zone is between about 80° C. and about 114° C. and wherein the residence time in said second reaction zone is between about 3 seconds and about 10 minutes.

References Cited in the file of this patent
UNITED STATES PATENTS

| | | |
|---|---|---|
| 2,270,135 | Mikeska | Jan. 13, 1942 |
| 2,304,080 | Frank | Dec. 8, 1942 |
| 2,345,013 | Soday | Mar. 28, 1944 |
| 2,795,571 | Schneider | June 11, 1957 |